United States Patent
Beesley et al.

(10) Patent No.: US 6,574,554 B1
(45) Date of Patent: *Jun. 3, 2003

(54) SYSTEM AND METHOD FOR CALCULATING A NAVIGATION ROUTE BASED ON NON-CONTIGUOUS CARTOGRAPHIC MAP DATABASES

(75) Inventors: Darin J. Beesley, Overland Park, KS (US); Michael Childs, Olathe, KS (US)

(73) Assignee: Garmin Ltd. (KY)

( * ) Notice: Subject to any disclaimer, the term of this patent is extended or adjusted under 35 U.S.C. 154(b) by 0 days.

This patent is subject to a terminal disclaimer.

(21) Appl. No.: 10/015,153

(22) Filed: Dec. 11, 2001

(51) Int. Cl.[7] .............................................. G01C 21/30
(52) U.S. Cl. .................... 701/209; 701/23; 701/201; 701/208; 701/212; 340/990
(58) Field of Search ................................. 701/200, 201, 701/208, 209, 210, 212, 23; 340/988, 990, 995

(56) References Cited

U.S. PATENT DOCUMENTS

| | | | | |
|---|---|---|---|---|
| 5,546,107 A | | 8/1996 | Deretsky et al. | 396/600 |
| 6,038,559 A | * | 3/2000 | Ashby et al. | 707/4 |
| 6,112,200 A | | 8/2000 | Livshutz et al. | 707/4 |
| 6,122,593 A | * | 9/2000 | Friederich et al. | 701/202 |
| 6,169,956 B1 | | 1/2001 | Morimoto et al. | 701/209 |
| 6,192,314 B1 | * | 2/2001 | Khavakh et al. | 701/209 |
| 6,298,303 B1 | * | 10/2001 | Khavakh et al. | 701/209 |

* cited by examiner

Primary Examiner—Gertrude Arthur
(74) Attorney, Agent, or Firm—Devon A. Rolf

(57) ABSTRACT

A method and apparatus are provided for calculating potential paths between source and destination locations. First and second map databases are provided that are indicative of roadway networks for geographic regions bounded by region edges and containing source and destination locations. The first and second map databases, are non-adjacent, non-contiguous such that the region edges of the first map database are separate and distinct from region edges of the second map database. Potential paths are calculated through the roadway network of the first map database up to a node or segment at which each potential path intersects a region edge of the first map database, thereby defining a node/edge coordinate. A transition location is obtained in the second map database that geographically corresponds to the node/edge coordinate at which a given potential path intersected the region edge of the first map database. The calculation continues from the transition location through the roadway network of the second map database. The method and apparatus may include organizing the map databases into a map hierarchy to define tiers for the map databases. The calculation process searches potential paths utilizing the tier-one map databases until each potential path intersects a map edge of the tier-one map, databases. Thereafter, the search through potential paths continues automatically based on the lower tier map databases.

28 Claims, 6 Drawing Sheets

SYSTEM AND METHOD FOR CALCULATING A NAVIGATION ROUTE BASED ON NON-CONTIGUOUS CARTOGRAPHIC MAP DATABASES

BACKGROUND OF THE INVENTION

Certain embodiments of the present invention generally relate to systems and methods for calculating navigation routes based on map databases indicative of overlapping, non-contiguous geographic regions. Certain embodiments of the present invention generally relate to navigation systems and methods that utilize roadway map databases organized in different tiers or levels of a map hierarchy.

Route planning systems are well known in the field of navigational instruments. Route planning systems in general calculate one or more paths through a network of roads between source and destination locations. The path(s) planned by the system may be based on one or more criteria, such as shortest distance, shortest time, user preferences and the like. Several algorithms are known for performing route planning, with such algorithms calculating the route from the source or destination location or from both simultaneously. Conventional planning algorithms operate based on a predefined stored map database, which includes data indicative of a geographic region containing the source and destination locations.

In general, each map database corresponds to a particular geographic region, such as a city, a county, a state, a country, a continent, etc. Each map database contains data indicative of features within the associated geographic region with varied levels of specificity concerning the features. For example, each map database includes data indicative of nodes representing intersections between roadways and data indicative of segments representative of roadway portions extending between nodes. In general, map databases representing smaller geographic regions (e.g. cities) contain more detailed feature information (county roads, city streets, restaurants, and the like), while map databases representing larger geographic regions (e.g. states and countries) contain less detailed feature information (e.g. interstates, state highways, gas stations, hotels, rest stops, and the like). The feature information stored within each map database may include geographic coordinates (i.e. altitude, longitude and latitude) among other things. Each map database is bound by a geographic region perimeter or boundary.

Conventional methods for route planning depend on the capabilities of system resources, such as processor speed and the amount and speed of memory. To reduce the amount of memory needed, route planning or navigation devices typically do not store a detailed map of a large geographic area, such as North America. Instead, the memory for the route planning or navigation device is initially loaded with a detailed map (e.g. a map database containing detailed feature information for a small geographic region) only for a select geographic region, such as a particular city in which the user travels. When the user wishes to chart a path across a particular city, the user enters the source and destination locations in the particular city. The route planning or navigation device uses the detailed map database for the corresponding city map to plan a route between the source and destination locations. Both the source and destination locations are within the boundaries of the detailed map (i.e. within the particular city).

The route planning or navigation device may instead be loaded with a less detailed "base" map (e.g. map database containing general feature information for a large geographic region), such as the United States. When the user wishes to chart a path between cities, across the country, etc., the user first selects or loads the base map and then enters the source and destination locations. The route planning and navigation device accesses and plans a route through the base map. Hence, for long trips, the route planning and navigation device only utilizes the base map and thus is only able to offer limited information regarding the details of a planned route.

Due to memory constraints, the base map database includes less detailed feature information and may lack feature information surrounding the source and destination locations of interest to the user. The user may desire detailed feature information present only in a detailed map database, such as street information for source and destination cities. In general, each map database is stored on a separate CD. The route planning and navigation device typically only accesses a single CD at any given time since the user can only load one CD at a time. Heretofore, the user could only chart routes through one detailed map database or through one base map database at any particular time, namely when the appropriate CD was loaded.

For example, when planning a trip between Kansas City and Denver, the user would load a CD into the route planning device containing only the base map database that would encompass both cities. The user would then enter source and destination coordinates within the base map database. If the user desired detailed street information for Kansas City, for example, directions to Arrowhead Stadium, conventional navigation devices were unable to provide such information while simultaneously providing a route between cities since the street information was only on detailed map databases, while only the base map database could be used to provide routing. Instead, the user was required to remove the CD containing the base map database and load a CD containing a detailed map database for Kansas City. The user then entered a source location, such as along interstate 70 on the west side of town, and a destination location for Arrowhead Stadium. Similarly, if the user desired detailed street information for Denver, the prior CD containing the Kansas City street map must be removed and a separate CD containing a detailed street map for Denver must be loaded. Source and destination locations would again need to be entered by the user for the Denver area. In the foregoing example, conventional navigation devices require the user to load three separate CDs and to perform three separate source and destination data entry procedures.

Presently, cartographic information is charted or mapped by data suppliers as large cartographic data blocks. A single cartographic data block may include detailed maps for multiple adjoining metropolitan areas and/or detailed maps for large geographic areas and the like. A cartographic data block is typically divided by the data supplier, by the manufacturer of the routing devices or by the service provider into smaller map databases having a size more conducive to storage on, or wireless transmission to, a navigation or route planning device. By way of example only, a large block of cartographic data may constitute a detailed map of the metropolitan corridor for the East coast between Washington, DC and Boston. The cartographic data block may be divided into a first map database for the Washington, DC metropolitan area, a second map database for the Baltimore metropolitan area, a third map database for the Philadelphia metropolitan area, and so on. The map databases for Washington, DC and Baltimore may include matching roadway/boundary longitude and latitude coordinates since the map databases were "cut" from a common cartographic data block or "fabric". However, each map database would nonetheless be provided as a separate map, such as on a separate CD. Accordingly, users would be required to switch CDs and perform independent routing operations based on discrete, separate map databases.

Today, numerous data suppliers map and chart roadway networks independent of one another. Typically, cartographic data from one supplier does not match cartographic data from a different supplier. Hence, when cartographic data blocks from different suppliers are divided into map databases, the map databases from different suppliers do not match, even though the map databases may be for common or overlapping geographic areas. For example, cartographic data for a map of Washington, DC from one data supplier will include geographic coordinates for the U.S. Capital that may differ (albeit slightly) from geographic coordinates in a second data supplier's cartographic data for the U.S. Capital. Similarly, the first supplier's cartographic data for downtown Washington, DC may include coordinates for Highways 50 and 66 that differ (albeit slightly) from coordinates for the same highways in a second supplier's cartographic data.

Conventional navigation and route planning devices must separately and independently access and operate on individual map databases even if multiple map databases are simultaneously loaded or accessible. The navigation and route planning devices are only able to calculate paths between sources and destinations in a single map database. Conventional route planning devices are unable to plan routes between source and destination locations that are located in different map databases.

A need exists for improved navigation and route planning devices capable of automatically calculating potential paths between a single source location and a single destination location based on any and all available map databases, regardless of whether the map databases 1) are contiguous or non-contiguous with one another, 2) are "cut" from common or different cartographic data blocks, or 3) are obtained from the same or different data suppliers. A need further exists for a navigation device capable of accessing multiple map databases to plan a single route.

BRIEF SUMMARY OF THE INVENTION

Certain embodiments of the present invention relate to a method for providing a navigation route between source and destination locations. The method includes providing first and second map databases indicative of roadway networks for geographic regions bounded by region edges. The first and second map databases each contain one of the source and destination locations. The first and second map databases are not contiguous with one another inasmuch as the region edges of the first and second map databases are separate and distinct from one another. The method further includes calculating potential paths through the roadway network of the first map database and identifying a node/edge coordinate at which each potential path intersects a region edge of the first map database. For each potential path, a transition location is identified in the second map database that geographically corresponds to the node/edge coordinate where the associated potential path intersects the region edge of the first map database. The method may further include searching the second map database for roads within a search perimeter surrounding the node/edge coordinate to obtain each transition location. The method continues by calculating potential paths from each transition location through the roadway network of the second map database. After a number of potential paths between the source and destination locations are analyzed, a navigation route is selected.

Optionally, the method may include organizing at least first and second map databases into first and second map tiers based on certain criteria, such as the data supplier of the first and second map databases and/or an amount of detailed feature information held in the map databases concerning corresponding geographic regions. Once the first and second map databases are organized into tiers, the planning method begins performing the first calculating step based on map databases in the first map tier. As potential paths intersect the boundary of the first map database, the planning method performs the obtaining and second calculating steps based on map databases in the second map tier.

Optionally, the first map database may contain a low level detailed map of the geographic region surrounding the source, the second map database may contain a high level base map of the geographic region encompassing both the first map database and a third map database that contains a low level detailed map of the geographic region surrounding the destination location. The first and third map databases may be non-overlapping and non-contiguous, or may be overlapping yet have other characteristics that cause them to be classified in different map tiers. Alternatively, the first map database may represent a detailed map of one metropolitan area and the second map database may represent a base map of a larger geographic region encompassing a portion of the first metropolitan area.

In another embodiment, a method is provided for calculating a navigation route between first and second points based on map databases organized in a map hierarchy. The method involves providing a number of map databases indicative of an equal number of roadway networks for geographic regions, with each map database having map edges. The method includes organizing the map databases into a map hierarchy by assigning at least one map database to a first level of the map hierarchy to define at least one tier-one map database and by assigning at least one map database to a second level of the map hierarchy to define at least one tier-two map database. The method also includes utilizing the tier-one map databases to plan potential paths from one of the first and second points until each potential path intersects the map edge of an outer tier-one map database; and thereafter, automatically continuing planning of each potential path based on the tier-two map databases.

The navigation route calculation method is capable of utilizing a variety of map databases. For example, the map databases may include first and second tier-one map databases that correspond to non-overlapping first and second geographic regions that surround the first and second points, respectively. Optionally, the map databases may include a tier N map database for a geographic region that contains the first point, but not the second point, and a tier N+M map database for a geographic region that contains both the first and second points. As another example, the map databases may include first and second tier N map databases for a geographic region that contains the first and second points, respectively, and a tier N+M map database for a geographic region partially overlapping the geographic regions associated with the first and second map databases, where the geographic region defined by data in the tier N+M map database excludes the first and second points. As yet another example, the map databases may include first and second tier N map databases containing detailed maps of areas surrounding the first and second points, respectively, and a tier N+M map database containing a base map overlapping both of the detailed maps, where the base map includes the first and second points.

The navigation route calculating method transitions from one map database to another, during a route planning search, each time a potential path intersects a boundary of a map database. To effect a transition from a current map database, the method first searches other map databases at the present tier, (e.g., assigned to the same tier as the current map database). The map databases at the present tier are searched for a point in a respective roadway network corresponding to the point at which potential path intersected the boundary of the current map database. If no map database is identified in the present tier, then the search is repeated for map databases at other tiers.

When searching map databases at a common tier, once potential paths intersect the map edge of a first tier-one map database, the calculation method determines whether a second tier-one map database exists that has a map edge that joins the map edge of the first tier-one map database. If no other tier-one map database has a map edge joining the first tier-one map database, then a local search is performed to identify a translation location in a tier-two map database. The local search is based on a location, at which the potential path intersects the map edge of the tier-one map database. The translation location represents a starting point within a tier-two map database from which the route planning operation continues along potential paths.

The calculating method may include identifying, in the tier-one map databases, a tier-one coordinate indicative of a point at which the potential path intersects the map edge and searching a geographic region for at least one of the tier-two map databases for a tier-two coordinate corresponding to the tier-one coordinate. Alternatively, the identifying step may include identifying, in the tier-two map databases, a road having a generally common direction of travel as the potential path at or near the point of intersection of the potential path with the map edge of the tier-one map database.

In an alternative embodiment, a navigation system is provided that includes memory storing map databases indicative of roadway networks in respective geographic regions surrounded by region edges. The map databases include first and second map databases. The geographic regions contain first and second navigation points. The first and second map databases correspond to geographic regions having separate and distinct non-adjacent region edges. The navigation system includes a planner calculating a path between the first and second navigation points based on roadway network information in both of the first and second map databases. The planner switches the search from potential paths defined in the first map database to potential paths defined in the second data each time the planner progresses along a potential path to a point at which the potential path intersects a region edge of the first map database. A display is provided to illustrate the final potential path generated by the planner. The system is operable with a compilation of map databases 1) that are contiguous, 2) that are not contiguous, 3) that overlap one another, 4) that are cut from common or different cartographic data blocks, and 5) that are obtained from different or common sources.

Optionally, the first and second map databases may be non-overlapping and the memory may store or have access to a third map database which at least partially overlaps the first and second map databases. When three map databases are employed in this manner, the navigation system jumps directly from the first map database to the third map database and then directly from the third map database to the second map database during the route planning operation as potential paths intersect map edges. Alternatively, when the first and second map databases do not overlap one another yet overlap a third map database, the navigation system may perform bi-directional route planning operations from the first and second map databases and jump to the third map database when the potential paths reach the edges of the first and second map databases.

The system may be equipped with a module that organizes the map databases into a mapping hierarchy by assigning the first map database to a first level to define a tier one map database and by assigning the second map database to a second level to define a tier-two map database.

In accordance with another embodiment, a hand-held portable navigation device is provided that includes memory storing map databases indicative of roadway networks and respective geographic regions surrounded by region edges. The map databases include first and second map databases that correspond to geographic regions having separate and distinct non-adjacent region edges. The geographic regions contain the first and second navigation points. The navigation device also includes a processor which calculates a path between the first and second navigation points based on roadway network information in both the first and second map databases. The processor moves, during a path-planning operation, from potential paths based on the first map database to potential paths based on the second map database and vice versa each time the potential path intersects a region edge for a map database. A display is provided to illustrate the final potential path generated by the processor.

The foregoing summary, as well as the following detailed description of certain embodiments of the present invention, will be better understood when read in conjunction with the appended drawings. It should be understood, however, that the present invention is not limited to the precise arrangements and instrumentality shown in the attached drawings.

DETAILED DESCRIPTION OF THE INVENTION

Figure 1:
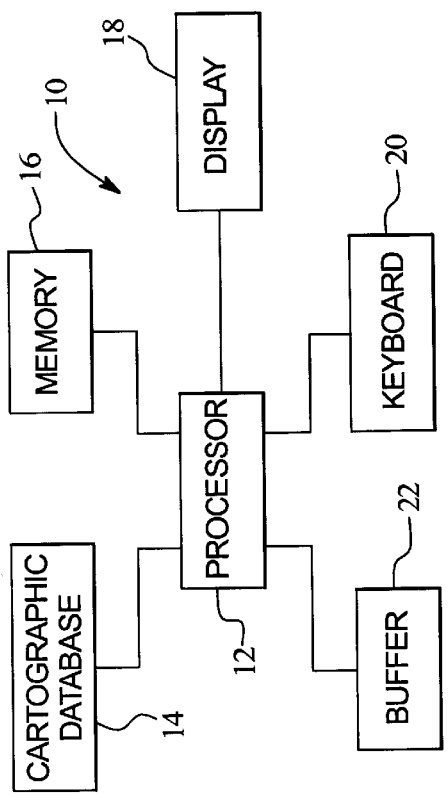
FIG. 1 (illustrates a block diagram of a navigation device formed in accordance with an embodiment of the present invention.

FIG. 1 illustrates a system 10 formed in accordance with an embodiment of the present invention. The system 10 includes at least one processor 12 for carrying out various processing operations discussed below in more detail. The processor 12 is connected to a cartographic database 14, memory 16, a display 18, a keyboard 20, and a buffer 22. Optionally, more than one processor 12 may be included. The cartographic database 14 may store data indicative of a roadway network (in full or in part) used in connection with embodiments of the present invention. The memory 16, while illustrated as a single block, may comprise multiple discrete memory locations and/or discs for storing various types of routines and data utilized and/or generated by embodiments of the present invention. The buffer 22 represents a memory storage area that may be within memory 16 or separate therefrom. Buffer 22 is used to temporarily store data and/or routines used in connection with embodiments of the present invention. The display 18 displays information to the user in an audio and/or video format. The keyboard 20 permits the user to input information, instructions and the like to the processor 12 during operation.

By way of example only, initial operations may be carried out by an operator of the system 10, utilizing the keyboard 20 for controlling the processor 12 in the selection of parameters, defining map databases to be developed and/or accessed, and the like.

The map database(s) stored in the cartographic database 14, memory 16, and/or buffer 22 may include data indicative of features associated with a roadway network and/or a geographic area. The data may represent points, lines, areas, coordinates (longitude, latitude and altitude), or otherwise. For instance, portions of a highway, river or boundary (e.g., a state or country boundary), trails and the like may be represented by linear features stored in the map database. In addition, cities, towns, neighborhoods, communities and the like may be represented by point features within the map database. Also, parks, lakes, points of interest and the like may be represented by area features. Prior to storage, various common features may be identified for cartographic data and such common features may be classified based upon predefined hierarchies. For example, interstate highways may be defined and/or organized as one feature class, state highways and roads may be defined as a second feature class, and county roads may be defined as a third feature class. Features other than roads, such as rivers and waterways, may also be classified. As a further example, geographic boundaries (e.g., state and county lines) may be assigned one or more different feature classes.

Figure 2:
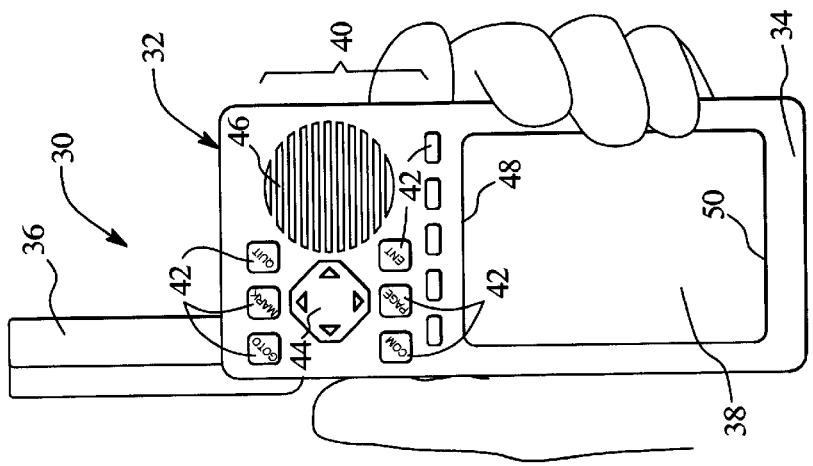
FIG. 2 illustrates a front view of a navigation device formed in accordance with an embodiment of the present invention.

FIG. 2 illustrates a portable electronic device 30 formed in accordance with an embodiment of the present invention. The electronic device 30 is oriented along a vertical axis (as illustrated) or horizontal axis when held by a user. The portable electronic device 30 includes a housing 32 having a face plate 34 and sidewalls and a back wall (not shown). The portable electronic device 30 further includes an antenna 36 mounted at one corner of the housing 32. The face plate 34 is substantially rectangular in shape. The face plate 34 securely frames the display screen 38 and houses the control panel 40. The control panel 40 includes several push button-type keys 42 that afford the user control over the portable electronic device 30.

Optionally, a directional toggle pad 44 may be included within the control panel 40. In one application, such as when utilizing the portable electronic device 30 within a global positioning system, the toggle pad 44 affords the ability to scan through a large map of a geographic area, all or a portion of which is stored in memory of the portable electronic device 30. The portable electronic device 30 then displays portions of the scanned map on the display screen 38. The display screen 38 also illustrates planned potential paths through geographic areas between source and destination locations. Optionally, the control panel 40 may include a speaker/microphone combination, designated by reference numeral 46, to afford communication between the operator and a remote destination.

The display screen 38 may be located below the control panel 40 (when oriented along a vertical axis) to afford easy data entry by the user. When vertically oriented, the display screen 38 is controlled to orient data upon the display screen 38 such that side 48 of the display screen 38 represents the top of the data to be displayed, while side 50 of the display screen 38 represents the bottom. Thus, the data is preferably displayed from the top 48 to the bottom 50 of the display screen 38.

Figure 3:
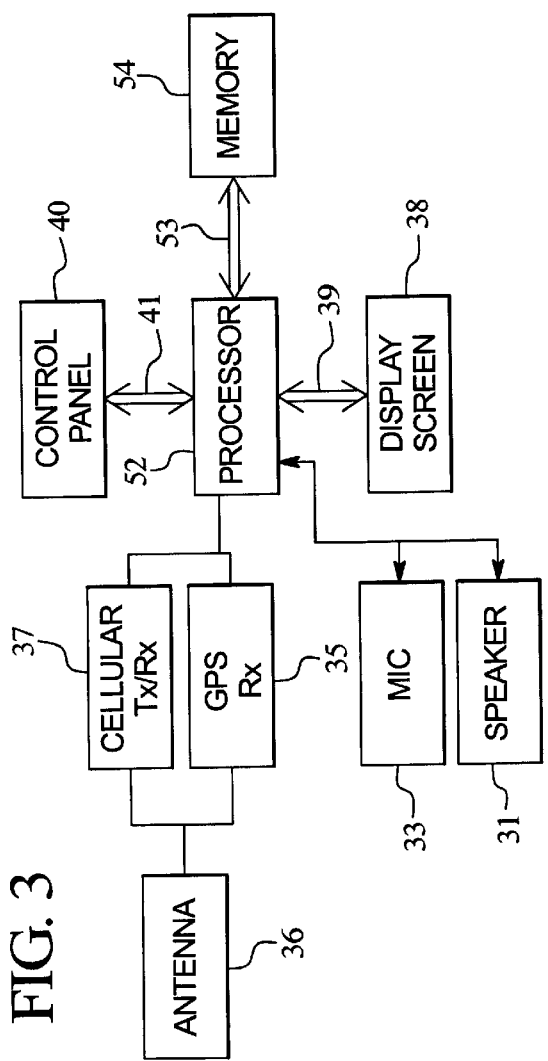
FIG. 3 illustrates a block diagram of a navigation device formed in accordance with an embodiment of the present invention.

FIG. 3 illustrates a block diagram for an electronic circuit of the portable electronic device 30 formed in accordance with an embodiment of the present invention. The electronic circuit includes a processor 52 that communicates via the control panel 40 through line 41. The processor 52 communicates via line 39 with the display screen 38. The electronic circuit further includes a memory 54 that is accessed by the processor 52 via line 53. The antenna 36 is connected to the processor 52 via a cellular transmitter/receiver 37 and a GPS receiver 35. The electronic circuitry of the portable electronic device 30 is powered by a power supply (not shown) housed within the device or connected thereto. A microphone 33 and a speaker 31 are also connected to, and communicate with, the processor 52.

The housing 32 of the portable electronic device 30 houses the processor 52, memory 54, display 38 and key pad 40. The display screen 38 and control panel 40 are accessible at the exterior of the housing. In one embodiment, the portable electronic device 30 is utilized in conjunction with a global positioning system for acquiring signals transmitted from satellites in geosynchronous orbit. In such an embodiment, the processor 52 includes means for calculating, by triangulation, the position of the portable electronic device 30. In such an embodiment, an image file indicative of a selected map is held in memory 54. In accordance with one embodiment, the image file held in memory 54 comprises spatial data indices according to a map database defining a geographic area of interest.

An operator of the portable electronic device 30 controls the processor 52 through use of control panel 40 to display map images on the display screen 38. Utilizing the control panel 40, the operator selects various zoom levels, corresponding to layers of the map database for a particular geographic region desired to be displayed on the display screen 38. Data indicative of the map to be displayed is accessed from the memory 54 according to the inputs by the user using the control panel 40. When performing a potential path planning operation, the operator enters a source location and a destination location, such as by entering addresses, geographic coordinates, well-known buildings or sites, and the like. The processor 52 accesses map databases stored in memory 54 to calculate a suggested potential path.

Figure 4:
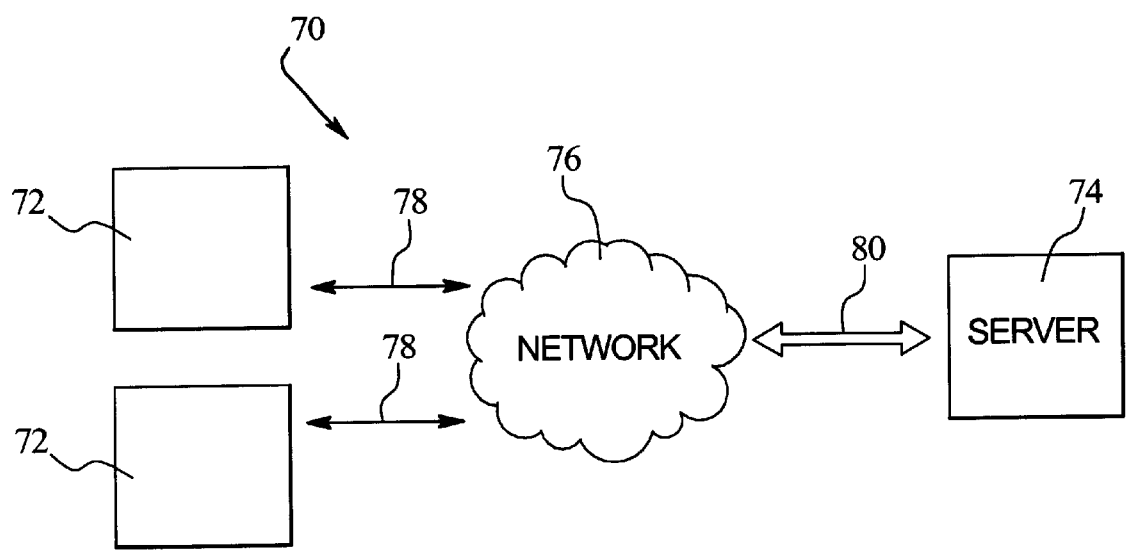
FIG. 4 illustrates a navigation system formed in accordance with an embodiment of the present invention.

FIG. 4 illustrates a navigation and routing system 70 formed in accordance with an alternative embodiment of the present invention. The system 70 includes one or more mobile units 72 capable of performing navigation and/or routing functions, a server 74 and an intervening network 76. The mobile units 72 may each include some or all of the structure and/or functionality of the portable electronic device 30. The server 74 may perform a majority of the navigation and potential path planning operations and transmit results and limited geographic data to the mobile units 72. Alternatively, the server 74 may simply perform minor management operations. The server 74 communicates with the mobile units 72 through communications links 78 and 80 and the network 76 which may constitute the internet, a wireless communications network supported by ground-based towers and/or satellites, and the like. The mobile units 72 may receive map databases, coordinate information, and the like over communications links 78 and 80 from the network 76.

Figure 5:
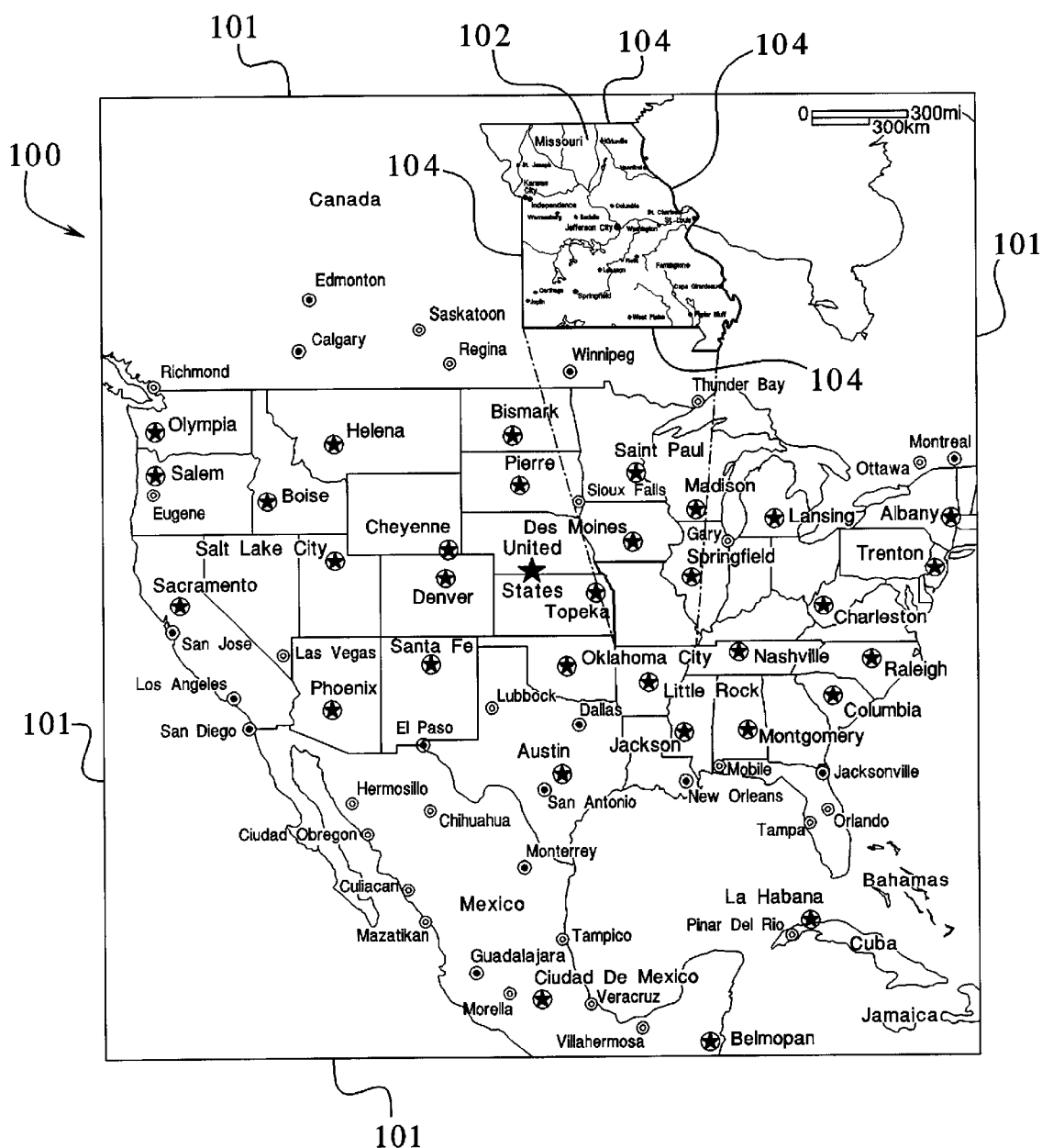
FIG. 5 illustrates a cartographic data block utilized in connection with certain embodiments of the present invention.

FIG. 5 illustrates a cartographic data block 100 including data indicative of a large geographic region bounded by edges 101. The exemplary cartographic data block 100 includes data representative of the continental United States and may be stored on the server 74. The cartographic data block 100 may include detailed feature data indicating the interstates, state highways, country roads, etc. in the United States, heretofore referred to as a roadway network.

The cartographic data block 100 is divisible into exemplary base map databases 102, each of which includes data indicative of a selected smaller geographic region surrounded by a region edge 104. In the example of FIG. 5, each map database 102 includes data indicative of the geographic region associated with a corresponding state bounded by the state border. One or more map databases 102 are stored in memory 16 or 54. Optionally, the map databases 102 may be transmitted upon request or periodically to mobile units 72 over communications links 78 and 80, and network 76.

Figure 6:
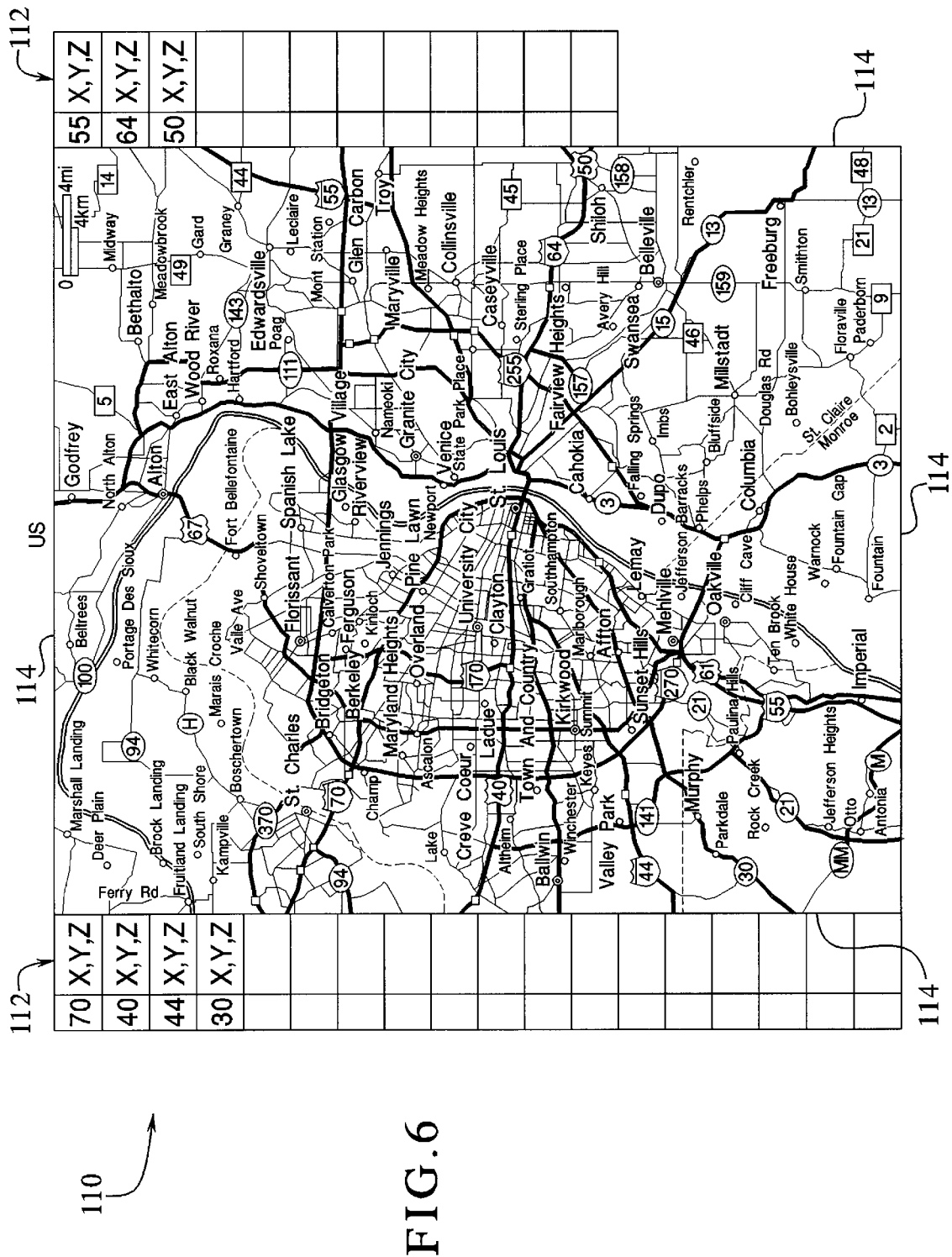
FIG. 6 illustrates an exemplary map database utilized in connection with certain embodiments of the present invention.

FIG. 6 illustrates an exemplary detailed map database 110 including data indicative of a geographic region for the St. Louis metropolitan area within region edges 114. The map database 110 is associated with a corresponding edge table 112 storing coordinates associated with the geographic locations at which selected roads intersect region edges 114 of the map database 110. In the example of FIG. 6, the edge table 112 stores coordinates for the points at which interstate 70, interstate 55 and other roads intersects the region edges 114 of the map database 110. A plurality of map databases 110 may be constructed from the cartographic data block 100 by dividing the cartographic data block 100 into adjacent sections having joining region edges 114 and storing, among other things, an edge table 112 for each map database 110.

It is understood that cartographic data blocks 100 may be provided from separate and independent data suppliers or vendors. Each separate data supplier or vendor may construct the data within respective cartographic data blocks 100 by independently mapping the roadway network. Hence, the geographic information for a particular feature may slightly differ between cartographic data blocks 100 from different suppliers. For example, the precise coordinates of interstate 70 across the Midwest may slightly differ in cartographic data blocks 100 from different suppliers or vendors.

The map databases 110 are organized or classified in accordance with a map hierarchy. In general, each map database 110 is assigned to a tier or level of the map hierarchy. The map hierarchy may include an unlimited number of tiers or levels. Each map tier or level may include more than one map database, but need not include any map databases. For example, one navigation device may store (or access over the network 76) map databases in map tiers #1 to #7, while a second navigation device may store (or access over the network 76) map databases only in map tiers #1, #4 and #5. A single navigation device should assign a particular map database to only one map tier, although different navigation devices may store or have access to the same map database. A particular map database may be assigned to one map tier in connection with a first navigation device and a different map tier in connection with a second navigation device. The map tiers may be organized based on a variety of criteria, such as accuracy of the data content, popularity, quantity of roadway features (restaurants, gas stations, etc.), feature sets (vacation points of interest, business points of interest, etc.), supplier of the data, operator preference, and the like.

Figure 7:
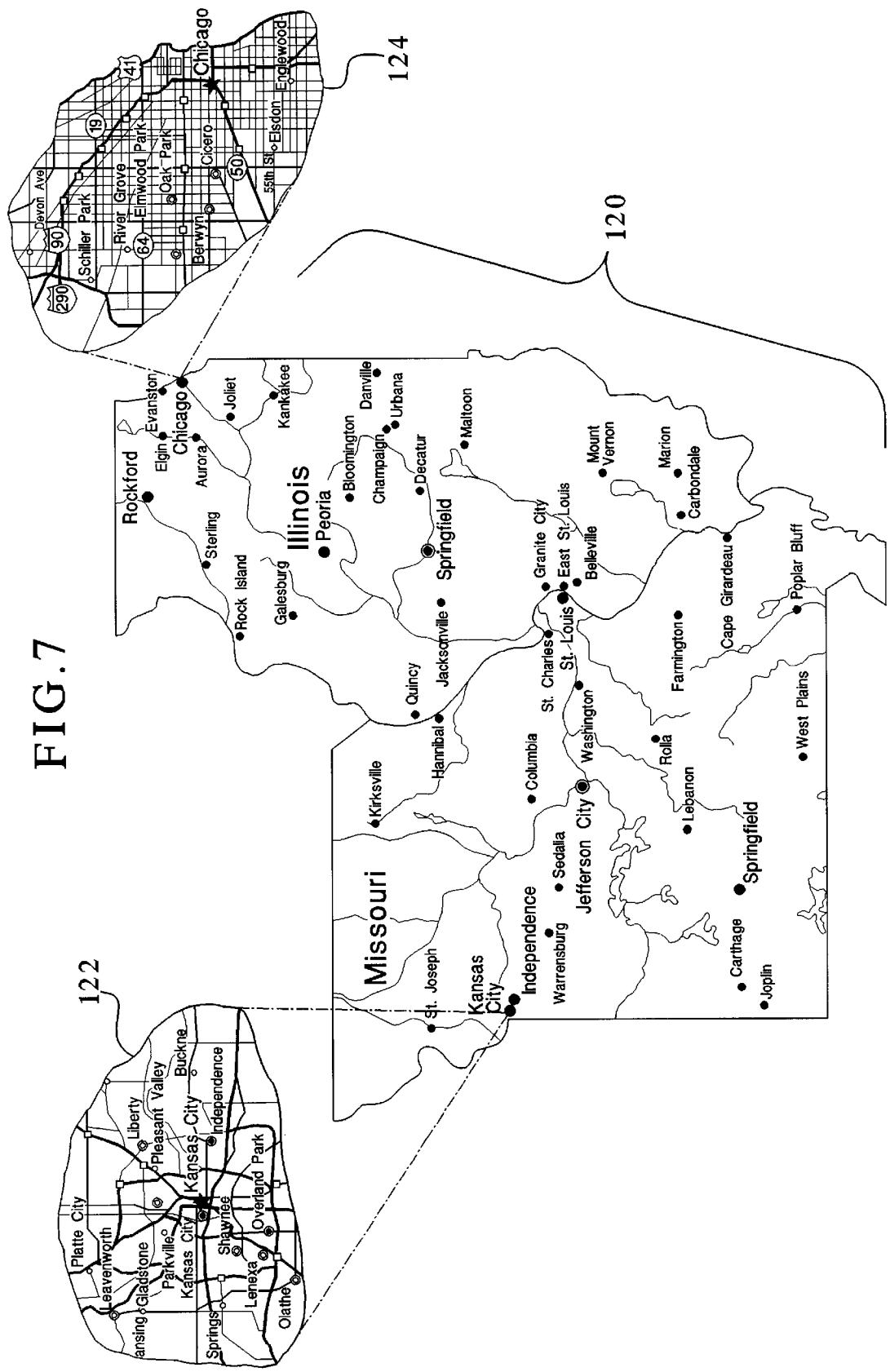
FIG. 7 illustrates an exemplary map tier organization used in connection with certain embodiments of the present invention.

FIG. 7 illustrates examples of various map databases that may be organized into a map hierarchy and stored in a mobile unit 72, server 74, navigation device 30, memory 54, memory 16 and the like. The exemplary map databases include a base map database 120 storing data indicative of a large geographic area. The base map database 120 may store a limited amount of detailed feature information about the corresponding geographic area. For example, the base map database 120 may store only data indicative of the interstate highway system throughout Missouri and Illinois. Detailed map databases 122 and 124 are organized into a map hierarchy. The exemplary detailed map databases 122 and 124 correspond to selected metropolitan areas, such as the Kansas City metropolitan area and the Chicago metropolitan area. The base map database 120 and the detailed map databases 122 and 124 may have been obtained from the same or different cartographic data blocks and/or from the same or different data suppliers. The example of FIG. 7 corresponds to a potential path planning operation in which a user may desire to plan a potential path between a specific address in Kansas City and a specific address in Chicago.

Figure 8:
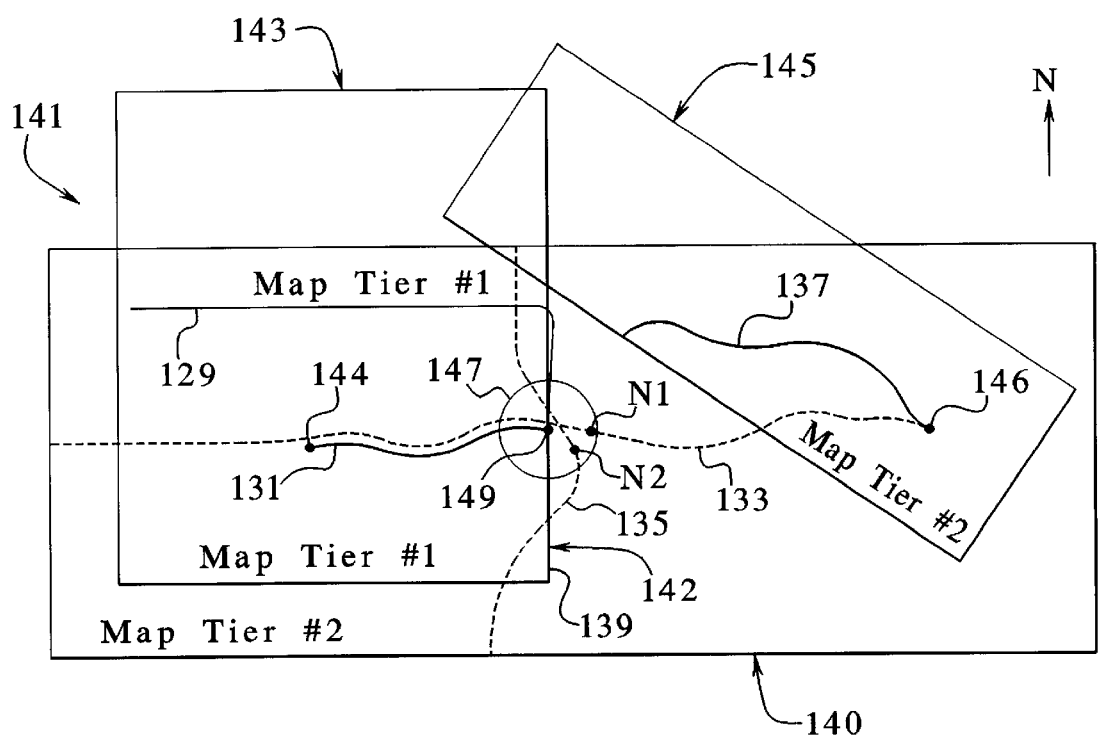
FIG. 8 graphically illustrates a potential path planning operation carried out in connection with an embodiment of the present invention.

FIG. 8 illustrates a map tier organization 141 in which map databases are arranged in bounded boxes and are assigned an order of in priority based on numerous criteria, such as accuracy of the data content, popularity, quantity of roadway features (restaurants, gas stations, etc.), feature sets (vacation points of interest, business points of interest, etc.), supplier of the data, operator preference, and the like. In the example of FIG. 8, low priority map databases 140 and 145 are assigned to a map tier #2 and high priority map databases 142 and 143 are assigned to a map tier #1. The map databases 140 and 145 include a source location 146, while the map databases 140 and 142 include the destination location 144. The map database 143 is located adjacent to the map database 142 along a common border 129 (e.g., a joining map edge). The map database 145 is oriented along an axis that differs from the longitudinal axis of the map databases 140, 142, and 143 which extend generally parallel to one another. The map database 145 partially overlaps the map database 143. The map databases may have various shapes, sizes and orientations.

The map databases 140, 142, 143 and 145 store data indicative of a roadway network, only a portion of which is illustrated in FIG. 8. The portion of the roadway network that is illustrated in FIG. 8 includes potential paths 131, 133, 135, and 137, along with source and destination locations 146 and 144. The potential paths 133 and 135 (as illustrated in dash lines) are entirely stored within the map database 140 and partially stored in map databases 142 and 145. Potential path 131 is stored within the map databases 140 and 142, while the potential path 137 is stored within the map databases 140 and 145. A portion of potential path 135 is also stored within map database 143.

While not illustrated in detail, it is understood that the potential paths 131, 133, 135 and 137 may be each formed from multiple segments and nodes. Segments represent portions of the roadway extending between intersections in the roadway. Nodes represent intersections between roadways. A potential path may represent a roadway segment extending from one node to the next adjacent node. A potential path may also represent a series of adjoining roadway segments extending from one node through a series of intermediate nodes adjacent to one another. FIG. 8 is discussed in more detail below in connection with FIG. 11.

Figure 9:
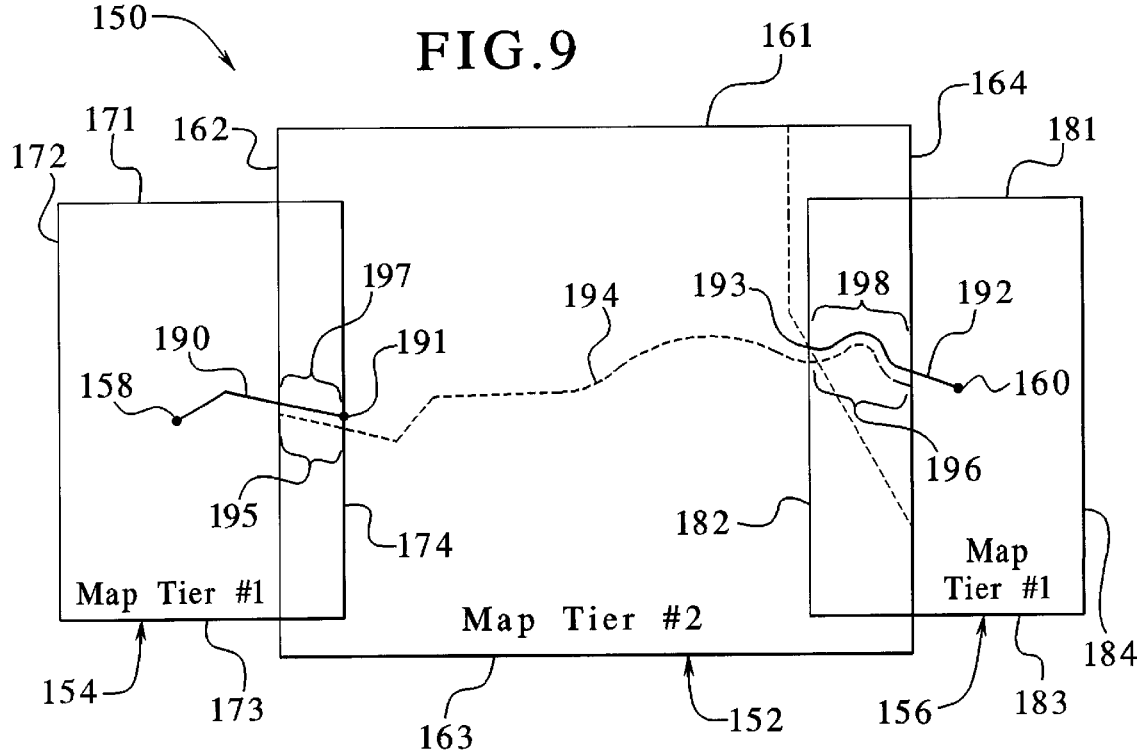
FIG. 9 graphically illustrates a transition point calculation operation carried out in accordance with an embodiment of the present invention.

FIG. 9 illustrates a map tier organization 150 including a base map database 152 assigned to a map tier #2 and detailed map databases 154 and 156 assigned to a map tier #1. A source location 158 and a destination location 160 are provided within the detailed map databases 154 and 156, respectively. The base map database 152 does not include either the source or destination locations 158 and 160. The base map database 152 contains only features within region edges 161–164, while the detailed map databases 154 and 156 include features for geographic areas within region edges 171–174 and 181–184, respectively. During operation, the route planning procedure initially searches one or both of detailed map databases 154 and 156 for potential paths between source and destination locations 158 and 160. When each potential path intersects the edges 174 and 182 (or any other region edges 171–173, 181 and 183–184) of the respective detailed map databases 154 and 156, the potential path planning operation attempts to continue following each potential path by switching to the base map database 152.

The map databases in the example of FIG. 9 are characterized as "base" and "detailed" to illustrate that map databases may be assigned to different tiers within the map tier organization 150 based, among other things, upon an amount of detailed information stored in each map database for a corresponding roadway network. For instance, the "base" map databases may store data only identifying larger highways, such as interstates and state highways, but not county roads or streets. In contrast, the detailed map databases may store much more detailed information regarding the roadway network, including information such as streets, street names, points of interest, and the like.

Figure 10:
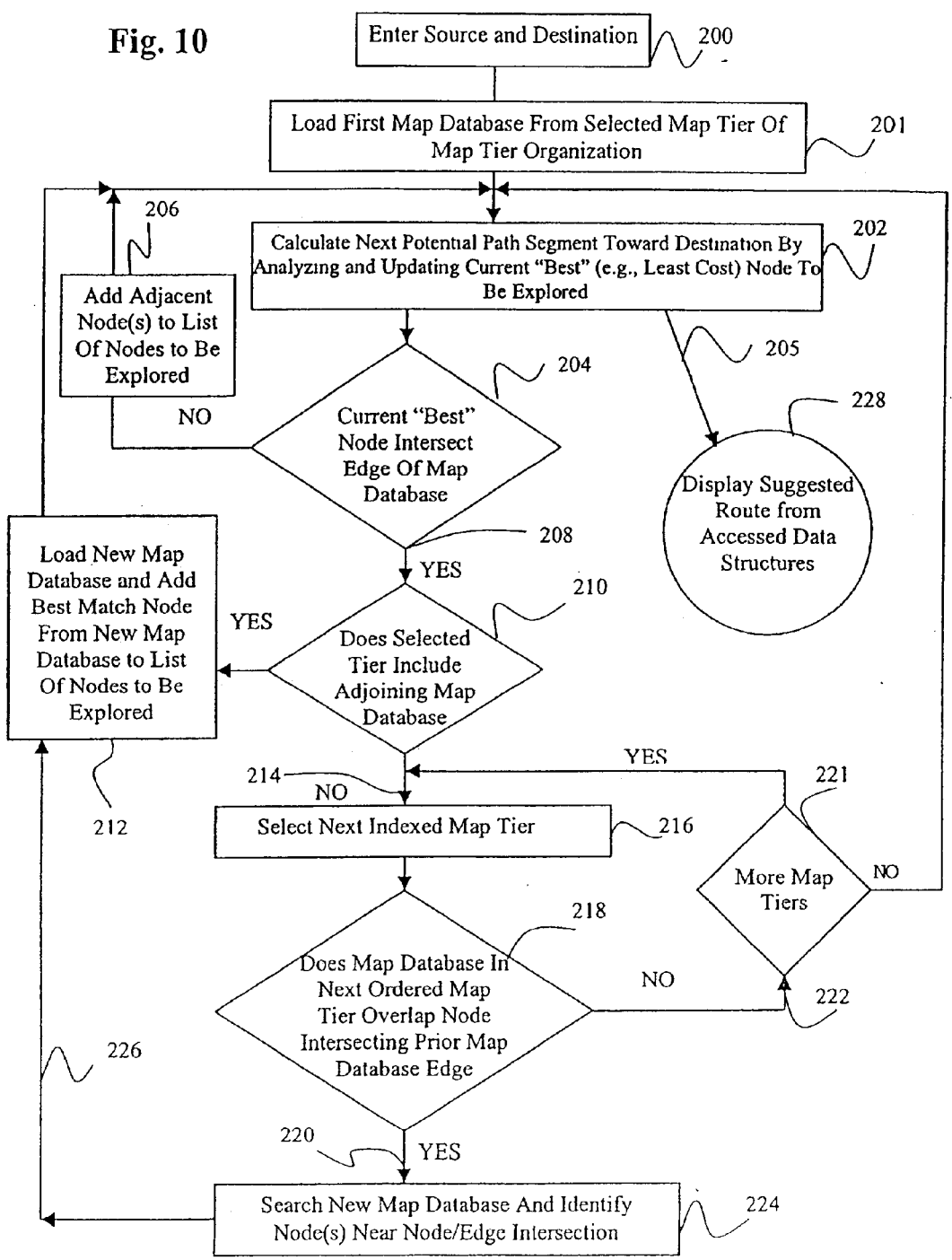
FIG. 10 illustrates a flow chart setting forth a planning sequence followed in accordance with an embodiment of the present invention.

FIG. 10 illustrates a flow chart of a procedure carried out in accordance with at least one embodiment of the present invention. The user enters source and destination locations at step 200. Thereafter, the navigation device accesses or loads a map database in a selected map tier (step 201) of a stored map tier organization 141 or 150. Optionally, the order of steps 200 and 201 may be reversed in that one or more map databases may be first accessed or loaded before the source and destination locations are entered. The accessed map database is hereafter referred to as the "loaded map database". The map tier organization 141 or 150 may be stored in the navigation device, memory 16, memory 54 or on the server 74. Accessing a map database may involve moving some or a portion of the map database to a section of memory in the navigation device readily accessible by the processor. Alternatively, mobile units 72 need not actually store the map database. Instead, the mobile units 72 may simply notify the server 74 that a particular map database is to be used. Thereafter, the server 74 may transmit some or all of the data from the map database to the mobile unit 72 as needed. Alternatively, the server 72 may perform the routing process upon the map database and simply provide status and result information to the mobile units 72.

The criteria for the selecting the initial map tier may vary. By way of example only, the selected map tier may represent maps having a greatest amount of detail at one or both of the source and destination locations, or may represent maps selected by the operator. Alternatively, the initially selected map tier may represent maps associated with a particular data supplier, such as a supplier offering the majority of the map databases for the navigation device or alternatively, the data supplier offering the most accurate map databases for one or both of the regions corresponding to the source and destination locations.

Once a map database for a selected map tier is loaded at step 201, the navigation device (or server 74) begins calculating potential paths between the source and destination locations at step 202 in accordance with any of several known routing algorithms, such as an A-star algorithm, a shortest distance algorithm and the like. Optionally, the routing algorithm may calculate potential paths simultaneously in opposite directions (bidirectionally) from both the source and destination locations. Alternatively, the routing algorithm may calculate the path from either of the source and destination locations.

The routing algorithm involves several iterative steps. Each iteration through the routing algorithm involves analyzing and updating the best (e.g., least costly) node to be considered or explored (hereafter the "current best node"). By way of example only, the analysis may involve expanding node adjacencies for the current best node (e.g., adding the nodes that are adjacent to the current best node to the list of nodes to be explored). The analysis may also involve calculating a cost associated with each newly added node. When implementing an A-star algorithm, the cost is based on a known cost from the source and an estimated cost to the destination. Once the node adjacencies and associated costs are added to the node exploration list, a new current best node is calculated. For example, the new current best node may represent the node having the lowest cost associated therewith. Once a new current best node is identified, flow passes to step 204. During each iteration through the routing algorithm, flow passes to step 204 where the navigation device determines whether the current best node intersects an edge of the loaded map database. For example, at step 204, a nodal record for the current best node may be analyzed to determine whether an edge marker is present. An edge marker would indicate that the current best node intersects the region edge of the loaded map database. If the current best node does not intersect the loaded map database edge, then the loaded map database should contain "adjacency" data indicative of the nodes that are adjacent to the current best node ("node adjacencies"). Accordingly, when the decision at step 204 is negative, flow passes to step 206, at which the loaded map database is accessed and the nodes adjacent to the current best node are added to the list of nodes to be explored. At step 206, the routing algorithm calculates a cost associated with each newly added node. The costs represent the known cost between the source and node, and the estimated cost between the node and the destination.

Alternatively, when the current best node represents an edge node, the loaded map database would not contain the node adjacencies for the current best node. Accordingly, flow passes from step 204 to step 210 to begin a sequence of steps to identify a new map database that contains the node adjacency information for the current best node picked at step 202.

At step 210, the navigation device determines whether the selected map tier includes any additional map databases that adjoin or fit together with the presently loaded map database along the appropriate region edge (e.g., the region edge intersected by the current best node or segment leading to the current best mode). By way of example, the navigation device may, at step 210, search a stored table of map adjacencies identifying which map databases join one another at each region edge. Alternatively, the navigation device may, at step 210, simply access every map database within the presently selected map tier and search the edge tables (if present) associated with each map database to locate a matching node in an adjoining map database. When the navigation device determines at step 210 that the selected map tier includes a map database adjoining the presently loaded map database along the edge intersecting the potential path, flow passes to step 212.

At step 212, the newly selected map database is loaded and the matching node from the newly loaded map database is added to the list of nodes to be explored by the routing algorithm at step 202. The matching node may be identified from an edge table. As explained above, map databases are considered to adjoin or be adjacent one another when they have a common region edge within a single map tier. Adjacent databases may be assigned edge tables defining coordinates for nodes and/or segments crossing the division between the map databases at matching geographic coordinates (e.g., longitude, latitude and altitude). Accordingly, when created, an edge table stores a one-to-one correlation between common nodes and/or segments along a region edge between adjacent map databases.

If, at step 210, the navigation device determines that the selected map tier has no additional map databases that join the presently loaded map database, flow passes along path 214 to step 216. At step 216, the navigation device selects the next ordered map tier and analyzes map databases associated with the newly selected map tier. At step 218, the navigation device determines whether the new map tier includes map databases that overlap the node or segment intersecting the edge of the prior map database (hereafter a "node/edge intersection"). If none of the map databases in the new map tier overlap the node/edge intersection of the old map database, flow passes along path 222 to decision block 221. At decision block 221, it is determined whether more map tiers exist and if so flow returns to path 214 and the navigation device increments the map tier at step 216. Steps 216, 218 and 221 are repeated until the navigation device determines at step 218 that the newly selected map tier includes a map database that overlaps the node/edge intersection point identified in step 204.

Next, processing passes along path 220 to step 224, at which the navigation device searches the map databases at the newly selected map tier for roadway information (e.g., nodes and/or segments) overlapping, or located within a predefined perimeter around the coordinates of the node/edge intersection point. The search carried out at step 224 may initially identify multiple nodes that intersect or are located within a predefined perimeter surrounding the coordinates of the node/edge intersection point. When more than one node is initially identified at step 224, the navigation device selects a preferred one of the available nodes based on the direction of travel at the node/edge intersection point and the direction(s) of travel afforded by the available nodes in the new map database within the predefined perimeter. Once a new node is identified in at least one new map database, flow passes back along path 226 to step 212, where the new map database is loaded or accessed and the new node is added to the list of nodes to be explored. Next, flow passes to step 202, at which a new current best node for exploration is analyzed.

Ultimately, flow passes along path 205 from step 202 when the complete route is planned or when it is determined that no path exists. At step 228, the suggested route, if any, between the source and destination locations is displayed from the multiple map databases accessed in steps 201 and 212.

Next, the processing sequence of FIG. 10 will be explained in connection with an example based on the map tier organization 150 in FIG. 9 and a bidirectional search. The navigation device accesses or stores the map tier organization 150. The user enters a source location 158 and a destination location 160 (step 200). The navigation device is set to initially analyze map databases in map tier #1, such as detailed map databases 154 and 156. The navigation device accesses the detailed map databases 154 and 156 at step 201 and, at step 202, begins calculating potential paths through the detailed map databases 154 and 156 bidirectionally. While only potential paths 190 and 192 are illustrated in FIG. 9, it is understood that the routing algorithm operating at step 202 is exploring other potential paths through detailed map databases 154 and 156 in parallel with potential paths 190 and 192. The calculation at steps 202 and 204 continues until potential paths 190 and 192 intersect the region edges 174 and 182, respectively, at node/edge intersection points 191 and 193. At step 204, when the navigation device determines that the potential paths 190 and 192 have intersected region edges 174 and 182, respectively, the navigation device next searches the tier #1 map databases in the map tier organization 150 for adjacent map databases (step 210). In the example of FIG. 9, no other map database exists at map tier #1 in the map tier organization 150 that joins either of region edges 174 and 182. Hence, flow passes from step 210 along path 214 to step 216, at which the navigation device selects map tier #2.

At step 218, the base map database 152 at tier #2 is identified to include region boundaries 162 and 164 that overlap the node/edge intersection points 191 and 193. Thus, flow passes along path 220 to step 224 at which transition locations in the base map database 152 is identified that correspond to the node/edge intersection points 191 and 192. Once the transition locations are identified, flow passes along path 226 back to step 212 at which the base map database 152 is accessed and used at step 202 to continue exploring the potential path 194. Also, at step 212, the node(s) identified in step 224 is/are added to the list of nodes to be explored. Again, while only potential path 194 is illustrated in FIG. 9, it is understood that the routing algorithm operates at step 202 in parallel to explore other potential paths through base map database 152.

When the route planning procedure is complete, the navigation device displays the suggested route to the operator by displaying a portion of the roadway network information from each of the base and detailed map databases 150, 154 and 156.

While the foregoing example is explained with respect to bi-directional searching from the source and destination locations 158 and 160, such bi-directional operation is not necessary. Instead, the routing algorithm may only calculate potential paths from one of the source and destination locations 158 and 160. If processing begins at the source location 158, the detailed map database 154 will be loaded or accessed first followed by the base map database 152. The detailed map database 156 would then be accessed after reaching the edge 164 of the base map database. The detailed map database 156 may be assigned to a map tier other than map tier #1, if the planner calculates the potential path from the source location 158 to the destination location 160.

In the example of FIG. 9, the potential path 194 includes roadway sections 195 and 196 that are located close to, but not identically overlapping with, corresponding roadway portions 197 and 198 of the potential paths 190 and 192, respectively, even though roadway sections 195 and 196 and roadway portions 197 and 198 constitute the same roads. This discrepancy may arise when different map databases do not include the same coordinates for a particular road. Instead, the roadway sections 195 and 196 may be assigned coordinates in the base map database 152 that differ by a few feet from the coordinates of the roadway portions 197 and 198 in the detailed map databases 154 and 156.

Figure 11:
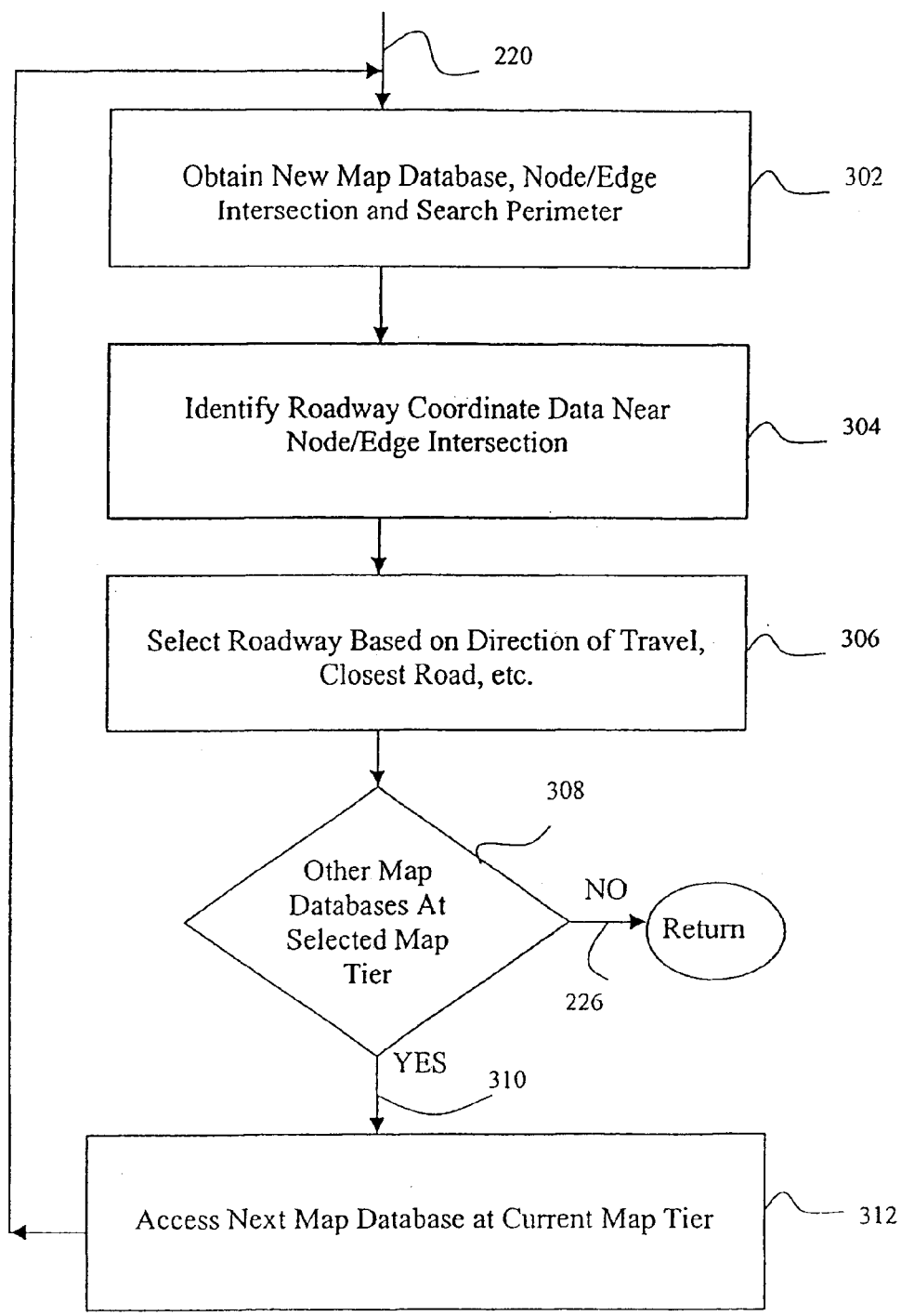
FIG. 11 illustrates a flow chart setting for a transition sequence followed in accordance with an embodiment of the present invention.

FIG. 11 illustrates the processing sequence carried out in accordance with one embodiment of the present invention for performing a transition between two overlapping, non-contiguous map databases, such as map databases in different map tiers or map databases in a common map tier but are not adjacent one another, nor an edge table establish a one-to-one edge node correspondence therebetween. The steps set forth in FIG. 11 are carried out by the navigation device when performing the operation at step 224 to locate a new map database having a node corresponding to the node/edge intersection coordinates of the most recently processed map database. The processing sequence set forth in FIG. 11 is described in connection with the map tier organization 141 set forth in FIG. 8 and a one-way search from the destination location 144 to source location 146.

The navigation device initially calculates potential path 131 from the destination location 144 to the edge 139 of the map database 142. The point of intersection between the potential path 131 and the edge 139 is designated as the node/edge intersection point 149. At step 218 in FIG. 10, the navigation device determines that, in the map tier organization 141, the map tier #2 includes map database 140 that overlaps the node/edge intersection point 149. Thereafter, flow passes to FIG. 11.

Beginning at step 302 in FIG. 11, the navigation device initially obtains the map database 140 to be searched, the node/edge intersection point 149 and the search perimeter 147. In the example of FIG. 8, the search perimeter 147 is designated by a circle surrounding the node/edge intersection point 149. The search perimeter 147 need not be circular, but instead may be oval, square, rectangular, or otherwise depending upon the search algorithm, the type of search being conducted, the geographic features being searched, the data format being searched and the like. The search perimeter 147 may vary in size depending upon factors, such as the number of roads being searched, the amount of data available, the speed with which the results are desired, the processing power available, and the like. In addition, the search perimeter 147 size may be varied based upon the difference between map tiers of the prior and new map databases. For instance, in the example of FIG. 8, the transition is between map tier #1 and map tier #2. Hence, the search perimeter 147 may be relatively small. If the map database transition is between map databases were more divergent map tiers (e.g., map tier #1 and map tier #7), the size of the search perimeter 147 may be increased or decreased accordingly.

Once the map database 140, node/edge intersection point 149 and search perimeter 147 are obtained at step 302, processing passes to step 304, at which the navigation device identifies, in map database 140, the coordinate data for nodes N1 and N2 near the node/edge intersection point 149. In the example of FIG. 8, the navigation device effectively locates coordinate data for potential paths 133 and 135 associated with nodes N1 and N2 since both are within the search perimeter 147. At, step 306, the navigation device selects one of potential paths 133 and 135 based upon other criteria, such as the closest road, the direction of travel along the roads and the like. For example, potential path 135 has a direction of travel that is generally in a northern and southern direction, while the direction of travel at the node/edge intersection point 149 along potential path 131 is generally in an eastern direction. At step 306, the navigation device selects potential path 133 since the direction of travel of potential path 133 is most closely associated with that of potential path 131 at the node/edge intersection point 149.

Next, flow passes to step 308 at which the navigation device determines whether additional map databases are available at the selected map tier. In the example of FIG. 8, only database 145 is also included at map tier #2. Thus, flow passes along path 310 to step 312 at which the navigation device accesses the next, map database 145 at the current map tier #2. Thereafter, steps 302–306 are repeated until no further map databases were available at the selected map tier. The navigation device then selects the most suitable map database at map tier #2 and continues the potential path planning operation based on the selected map database at step 201 (FIG. 10). Upon completion, the display illustrates portions of the roadway network from map databases 140 and 142, but not from map databases 143 and 145.

In the foregoing examples, tier-one and tier-two map databases are discussed. However, any number of tiers may be used and the processing of sequences FIGS. 10 and 11 may be carried out on any tier, namely tier N, and stepped up to any other tier, namely tier N+M, where N and M are integers.

Optionally, steps 216 and 218 of FIG. 10 may be modified to enable repeated searches through the map tiers. Hence, once all of the map tiers are indexed through, the map tier index is reset to the highest priority map tier. For instance, the selected map tier used at steps 202–210 may be a low priority map database, such as tier #6. When processing passes to steps 216 and 218, even lower tier maps will be searched, such as tier #7 or lower. However, the lowest tier may not include any map databases that overlap the edge/node intersection point. In this alternative embodiment, if the process advances through all of the map tiers at steps 216 and 218 without locating a map database that overlaps the edge/node intersection, then the map tier index is reset to the highest map tier, such as map tier #1.

In accordance with the foregoing, a navigation system, method and device are provided that permit routing between overlapping, non-adjacent, non-contiguous maps, such as between base maps and detailed maps, between maps of equal detail but from different sources, between maps cut from different cartographic data blocks or between maps cut from a common cartographic data block, but lacking edge tables. The process set forth in FIGS. 10 and 11 provide a facility to transfer routing control automatically through a mapping hierarchy between different map databases to permit a navigation device to calculate potential paths between source and destination locations located in different map databases. The routing process detects the edge of a detailed map area and, when no other detailed map areas exist that are adjacent thereto along the corresponding edge, the process transfers control down through a mapping hierarchy to lower tiered maps until locating one or more map databases that are capable of supporting the route planning procedure.

Certain embodiments enable route planning to be carried out without separately and interchangeably loading detailed maps for a large geographic area or detailed maps for several adjacent geographic areas. Certain embodiments enable route planning to be carried out based on a single source and destination entered by the user, while drawing upon multiple map databases provided from multiple sources, such as different data suppliers. The detailed maps associated with the map databases need not line up, nor be seamless with one another, to still be automatically accessible within a single final or complete route planning operation. Hence, certain embodiments provide the ability to combine maps that were not built together or cut from a common cartographic data block or "fiber", yet are equally useful with one another.

Optionally, the server 76 may simply transmit map databases for requested geographic regions to the mobile units 72, after which the mobile units 72 carry out all necessary processing to perform navigation and routing operations. Alternatively, the mobile units 72 need not store the map databases. Instead, the server 74 may maintain the map databases and carry out navigation and routing calculations based upon requests received from the mobile unit 72. For example, the user may enter source and destination locations for a desired routing operation. The source and destination coordinates are transmitted from the mobile unit 72 through the communications links 78 and 80 and network 76 to the server 74 which calculates the desired route and returns such information to the mobile unit 72. In this alternative embodiment, the mobile unit 72 need not store large cartographic data blocks or map databases that would otherwise be needed to calculate and plan a route.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for calculating potential paths through nodes in a roadway network between source and destination locations, comprising:

providing a first map database indicative of a roadway network for a first geographic region bounded by first region edges and containing one of a source location and a destination location;

providing a second map database indicative of a roadway network for a second geographic region bounded by second region edges, second geographic region at least partially overlapping said second geographic region said first region edges being separate and distinct from said second region edges;

first calculating potential paths though the roadway network of said first map database until a current potential path intersects one of said first region edges of said first map database at a node/edge coordinate;

obtaining a transition location in said second map database geographically corresponding to said node/edge coordinate at which said current potential path intersects said first region edge of said first map database; and second calculating a second potential path from said transition location through the roadway network of said second map database.

2. The method of claim 1, further comprising:

organizing at least said first and second map databases in first and second map tiers based on a data supplier of said first and second map databases; and performing said first calculating step based on map databases in said first map tier before performing said obtaining and second calculating steps with respect to said second map database in said second map tier.

3. The method of claim 1, further comprising:

organizing multiple map databases into first and second map tiers based on an amount of detailed feature information held in said first and second map databases concerning corresponding first and second geographic regions, said first and second map databases being organized into said first and second map tiers, respectively; and performing said first calculating step based on said map databases in said first map tier that are adjacent to said first map database before performing said obtaining and second calculating steps with respect to said map databases in said second map tier.

4. The method of claim 1, further comprising;

organizing multiple map databases in first and second map tiers;

when said first potential path reaches said region edge of said first map database, determining whether said first map tier includes another map database indicative of a roadway network for a geographic region adjacent to said first map database; and performing said obtaining step only after said first calculating step accesses all adjacent map databases in said first map tier.

5. The method of claim 1, wherein said obtaining step searches said second map database for transition locations within a bounded box surrounding said node/edge coordinate.

6. The method of claim 1, wherein said providing steps include providing said first map database with data indicative of a low-level detailed map of the geographic region surrounding said source location, providing said second map database with data indicative of a high-level base map of the geographic region encompassing both of said source and destination locations, and providing a third map database with data indicative of a low-level detailed map of the geographic region surrounding said destination location, said first and third map databases being non-overlapping and non-contiguous.

7. The method of claim 1, wherein said first map database includes data indicative of a detailed map of the roadway network for a first metropolitan area and said second map database includes data indicative of a base map of the roadway network for a large geographic region at least partially encompassing the first metropolitan area.

8. The method of claim 1, wherein said first map database includes data indicative of a detailed map of the roadway network for a small geographic region and said second map database includes data indicative of a base map of the roadway network for a large geographic region at least partially encompassing the small geographic region.

9. The method of claim 1, further comprising organizing the first and second map databases in a tiered map hierarchy with the first and second map databases being assigned to different tiers.

10. A method for calculating a potential path from a first point toward a second point, comprising:

providing a plurality of map databases indicative of an equal plurality of roadway networks for geographic regions, each map database being surrounded by map edges;

organizing said plurality of map databases into a map hierarchy by assigning at least one map database to a first level of said map hierarchy to define at least one tier-one map database and by assigning at least one map database to a second level of said map hierarchy to define at least one tier-two map database;

utilizing said tier-one map databases to plan potential paths from a first point toward a second point until at least one of said potential paths intersects a map edge of said tier-one map databases; and when said at least one of said potential paths intersects said map edge of said tier-one map databases, automatically continuing planning said at least one of said potential paths based on said tier-two map databases.

11. The method of claim 10, wherein said map databases include first and second tier-one map databases including data indicative of geographic regions surrounding said first and second points, respectively, said first and second tier-one map databases corresponding to non-overlapping geographic regions.

12. The method of claim 10, wherein said map databases include a tier-one map database including data indicative of a geographic region containing said first point and excluding said second point, said map databases including a tier-two map database including data indicative of a geographic region containing said first and second points.

13. The method of claim 10, wherein said map databases include first and second tier-one map databases including data indicative of a geographic region containing said first and second points, respectively, and a tier-two map database including data indicative of a geographic region partially overlapping said geographic regions identified by data in said first and second map databases, said geographic region identified by data in said tier-two map database excluding said first and second points.

14. The method of claim 10, wherein said map databases include first and second tier-one map databases including data indicative of a geographic region containing detailed maps of areas surrounding said first and second points, respectively, and a tier-two map database including data indicative of a geographic region containing a base map overlapping both of said detailed maps, said base map including said first and second points.

15. The method of claim 10, further comprising:

searching said tier-two map databases for a node in a respective roadway network corresponding to a node at which said at least one of said potential paths intersects said map edge in said tier-one map databases.

16. The method of claim 10, further comprising:

when said at least one of said potential paths intersects said map edge of a first tier-one map database, determining whether any other tier-one map databases exist that have map edges that join said map edge of said first tier-one map database intersected by said at least one of said potential paths.

17. The method of claim 10, further comprising:

determining a translation node in said tier-two map databases based on a location at which said at least one of said potential paths intersects said map edge of said tier-one map databases, said translation node representing a starting point within said tier-two map databases from which said planning step continues.

18. The method of claim 10, further comprising:

identifying, in said tier-one map databases, a tier-one coordinate indicative of a point at which said at least one of said potential paths intersects said map edge; and searching a geographic region for at least one of said tier-two map databases for a tier-two coordinate corresponding to said tier-one coordinate.

19. The method of claim 10, further comprising:

identifying, in said tier-two map databases, a road having a generally common direction of travel as said at least one of said potential paths at a point of intersection of said at least one of said potential paths with said map edge of said tier-one map database.

20. A navigation system, comprising:

memory storing map databases indicative of roadway networks in respective geographic regions surrounded by region edges, said map databases including first and second map databases, said geographic regions containing first and second navigation points, said first and second map databases corresponding to geographic regions having separate and distinct non-adjacent region edges;

a planner calculating paths between said first and second navigation points based on roadway network information in both of said first and second map databases, said planner switching from calculations based on said first map database to calculations based on said second map database once said planner calculates at least one path through said first map database to a node at which at least one said path intersects a region edge of said first map database; and a display displaying a final route based on said at least one path calculated by said planner.

21. The navigation system of claim 21, wherein said first map database represents a detailed map of a roadway network surrounding said first navigation point and wherein said second map database represents a base map of a roadway network surrounding both of said first and second navigation points.

22. The navigation system of claim 21, wherein said first map database represents a detailed map of a roadway network surrounding said first navigation point and wherein said second map database represents a base map of a roadway network surrounding said second navigation point and excluding said first navigation point, said base map partially overlapping said detailed map.

23. The navigation system of claim 21, wherein said first and second map databases do not overlap, said memory storing a third map database indicative of a geographic region at least partially overlapping said first and second map databases, said planner jumping directly from said first map database to said third map database and then directly to said second map database.

24. The navigation system of claim 21, wherein said first and second map databases do not overlap, said memory storing a third map database indicative of a geographic region at least partially overlapping said first and second map databases, said planner jumping from said first and second map databases in parallel to said third map database.

25. The navigation system of claim 21, further comprising an organization module that organizes said map databases into a mapping hierarchy by assigning at least said first map database to a first level of said mapping hierarchy to define tier-one map databases and by assigning at least said second map database to a second level of said mapping hierarchy to define tier-two map databases.

26. The navigation system of claim 21, wherein said memory includes a third map database containing said second navigation point, said first and third map databases corresponding to non-overlapping non-adjacent geographic regions, said planner simultaneously calculating paths from said first and second navigation points beginning in said first and third map databases, said planner jumping from said first and third map databases to said second map database when said paths intersect said boundary edges of said first and third map databases.

27. The navigation system of claim 21, wherein said planner calculates a path/edge coordinate at which said at least one path intersects said boundary edge of said first map database, said planner calculated a transition location in said second map database that corresponds to said path/edge coordinate.

28. A navigation device, comprising:

memory storing map databases indicative of roadway networks in respective geographic regions surrounded by region edges, said map databases including first and second map databases, said geographic regions containing first and second navigation points, said first and second map databases corresponding to geographic regions having separate and distinct non-adjacent region edges;

a processor calculating paths between said first and second navigation points based on roadway network information in both of said first and second map databases, said processor moving from operation based on said first map database to operation based on said second map database once said processor calculates at least one path through said first map database to a node at which said at least one path intersects a region edge of said first map database; and a display displaying a route based on said at least one path calculated by said processor.

* * * * *

UNITED STATES PATENT AND TRADEMARK OFFICE
CERTIFICATE OF CORRECTION

PATENT NO.    : 6,574,554 B1
DATED         : June 3, 2003
INVENTOR(S)   : Darin J. Beesley and Michael Childs It is certified that error appears in the above-identified patent and that said Letters Patent is hereby corrected as shown below:

Drawings,
Add attached Figs. 10 and 11.

Signed and Sealed this

Sixth Day of July, 2004

JON W. DUDAS
*Acting Director of the United States Patent and Trademark Office*